United States Patent
Kunichi et al.

(10) Patent No.: US 8,604,378 B2
(45) Date of Patent: Dec. 10, 2013

(54) ELECTRODE UNIT AND RESISTANCE WELDING DEVICE

(75) Inventors: Takahiro Kunichi, Wako (JP); Yoshiki Morishita, Wako (JP); Takeomi Okimitsu, Wako (JP); Akihiko Koshido, Wako (JP); Hiroki Sato, Wako (JP); Tsuyoshi Yadori, Wako (JP); Daisuke Sato, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 358 days.

(21) Appl. No.: 13/055,294

(22) PCT Filed: Jul. 17, 2009

(86) PCT No.: PCT/JP2009/062972
§ 371 (c)(1),
(2), (4) Date: Jan. 21, 2011

(87) PCT Pub. No.: WO2010/010852
PCT Pub. Date: Jan. 28, 2010

(65) Prior Publication Data
US 2011/0127239 A1   Jun. 2, 2011

(30) Foreign Application Priority Data
Jul. 23, 2008 (JP) ................... 2008-189618

(51) Int. Cl.
*B23K 11/10* (2006.01)
*B23K 9/24* (2006.01)

(52) U.S. Cl.
USPC ........................ 219/91.1; 219/119

(58) Field of Classification Search
USPC .......... 219/91.1–94, 98, 117, 78, 87, 109, 86, 219/119; 411/171
See application file for complete search history.

(56) References Cited

U.S. PATENT DOCUMENTS

| | | | | | |
|---|---|---|---|---|---|
| 2,097,377 | A | * | 10/1937 | Martin | 219/86.61 |
| 3,562,482 | A | * | 2/1971 | Friedberg et al. | 219/86.33 |
| 4,117,296 | A | * | 9/1978 | Becker | 219/91.21 |
| 4,208,568 | A | * | 6/1980 | Bakewicz et al. | 219/86.31 |
| 5,285,043 | A | * | 2/1994 | Smith | 219/87 |
| 5,914,056 | A | * | 6/1999 | Yamaguchi | 219/86.41 |

FOREIGN PATENT DOCUMENTS

| | | | |
|---|---|---|---|
| JP | 01-186227 | | 7/1989 |
| JP | 2002-035945 | | 2/2002 |
| JP | 2003-156532 | | 5/2003 |
| JP | 2003-158292 A | * | 12/2004 |
| JP | 2008-008050 | | 1/2008 |
| JP | 2008-023554 | | 2/2008 |

* cited by examiner

Primary Examiner — Tu B Hoang
Assistant Examiner — Renee L Miller
(74) Attorney, Agent, or Firm — Squire Sanders (US) LLP

(57) ABSTRACT

An electrode unit configuring a resistance welding device is provided with a first chassis section and a second chassis section. A plurality of stepped hole sections are formed in the first chassis section, and an electrode pin is slidably provided in each stepped hole section. On the head section of the electrode pin, a resin ball configuring a welding pressure adjusting mechanism is disposed. In the second chassis section, a screw hole is formed coaxially with each stepped hole section, and a setscrew configuring an extrusion output adjusting mechanism for adjusting an extrusion output of the electrode pin is screwed into each screw hole.

9 Claims, 13 Drawing Sheets

ELECTRODE UNIT AND RESISTANCE WELDING DEVICE

TECHNICAL FIELD

The present invention relates to an electrode unit used for a resistance welder (resistance welding device) having a pair of positive and negative electrodes, the pair of electrodes pressing and energizing a workpiece under pressure to weld the workpiece, and a resistance welder.

BACKGROUND ART

Two or more metal pieces that are mutually layered are often bonded by a resistance welding, in which the metal pieces are energized to generate Joule heat to melt the metal pieces while pressing the metal pieces.

A plurality of points have to be welded in order to weld, for instance, a current collecting tab and a current collector of a battery (e.g. a button battery) or terminals of a circuit board. Further, in order to provide a separator of a fuel cell, two or more metal plates are integrally bonded by bonding the metal plates at a plurality of points.

When there are concavity and convexity (e.g. embosses) or steps on a surface of a workpiece in the above welding process, it is desired to reduce unevenness of the weld strength and the time required for the welding step.

In view of the above, a welder and a welding method of an electroconductive member of a battery are disclosed in Japanese Laid-Open Publication No. 2002-035945. As shown in FIG. 13, the welder includes two pressure-side weld electrodes (negative electrodes) 1a and 1b. The pressure-side weld electrodes 1a and 1b are respectively attached to electrode holders 3a and 3b each having welding pressure adjusters 2a and 2b that are capable of independently adjusting the welding pressure. The pressure-side weld electrodes 1a and 1b are connected to one of electrodes of a power source 4.

On the other hand, a stationary weld electrode (positive electrode) 6 is disposed on the other side of a workpiece 5 that is composed of a member 5a and a member 5b. The stationary weld electrode 6 is connected to the other one of the electrode of the power source 4.

With the above arrangement, it is asserted that two points can be simultaneously welded by the pressure-side weld electrodes 1a and 1b and the welding pressures applied on the pressure-side weld electrodes 1a and 1b can be equalized by virtue of the welding pressure adjusters 2a and 2b, so that an even nugget can be provided.

However, in order to weld the workpiece 5 at two points, Japanese Laid-Open Publication 2002-035945 requires that the pressure-side weld electrodes 1a and 1b, the welding pressure adjusters 2a and 2b and the electrode holders 3a and 3b have to be provided as separate components. Thus, the arrangement becomes complex, thus failing to reduce the size of the entire welder.

Further, when the workpiece 5 is welded at three or more points, the pressure-side weld electrodes 1a and 1b cannot simultaneously weld the three or more target points on the workpiece 5. Accordingly, it is difficult to apply an even pressure on each of the welding points.

SUMMARY OF INVENTION

The present invention is made to overcome the above deficiencies. An object of the present invention is to provide an electrode unit having a simple and compact arrangement while allowing a simultaneous welding of a plurality of welding points with an even pressure and contact state, and a resistance welder.

The present invention relates to an electrode unit used for a resistance welder, the resistance welder having a pair of positive and negative electrodes, the pair of electrodes pressing and energizing a workpiece to weld the workpiece.

The electrode unit includes: a case interposed between one of the electrodes and the workpiece; a plurality of electrode pins provided in the case, the plurality of electrode pins being independently movable toward and away from the workpiece to be in contact with the workpiece for applying an electric current to the workpiece; a welding pressure adjusting mechanism that independently adjusts a welding pressure applied on each of the electrode pins toward the workpiece; and a protrusion adjusting mechanism that independently adjusts a protrusion of each of the electrode pins toward the workpiece.

Further, the present invention relates to a resistance welder including a pair of positive and negative electrodes that press and energize a workpiece to weld the workpiece.

The resistance welder includes: a pressurizing mechanism that applies a welding pressure to one of the electrodes; and an electrode unit that is electrically coupled with the one of the electrodes. The electrode unit comprises a case interposed between the one of the electrodes and the workpiece. The case includes: a plurality of electrode pins, each of the plurality of electrode pins being independently movable toward and away from the workpiece to be in contact with the workpiece for applying an electric current to the workpiece; a welding pressure adjusting mechanism that independently adjusts a welding pressure applied on each of the electrode pins toward the workpiece; and a protrusion adjusting mechanism that independently adjusts a protrusion of each of the electrode pins toward the workpiece.

In the present invention, while being pressed by the one of the electrodes, a plurality of points are simultaneously welded by the plurality of electrode pins provided in the case. At this time, the welding pressure of each of the electrode pins against the workpiece and the protrusion of each of the electrode pins toward the workpiece are independently adjusted. Thus, irrespective of the surface configuration (concavity and convexity; e.g. embosses) of the workpiece, a plurality of welding points can be favorably welded at an even pressure and contact state with a simple and compact arrangement to provide a high-quality welding.

DESCRIPTION OF EMBODIMENTS

Figure 1:
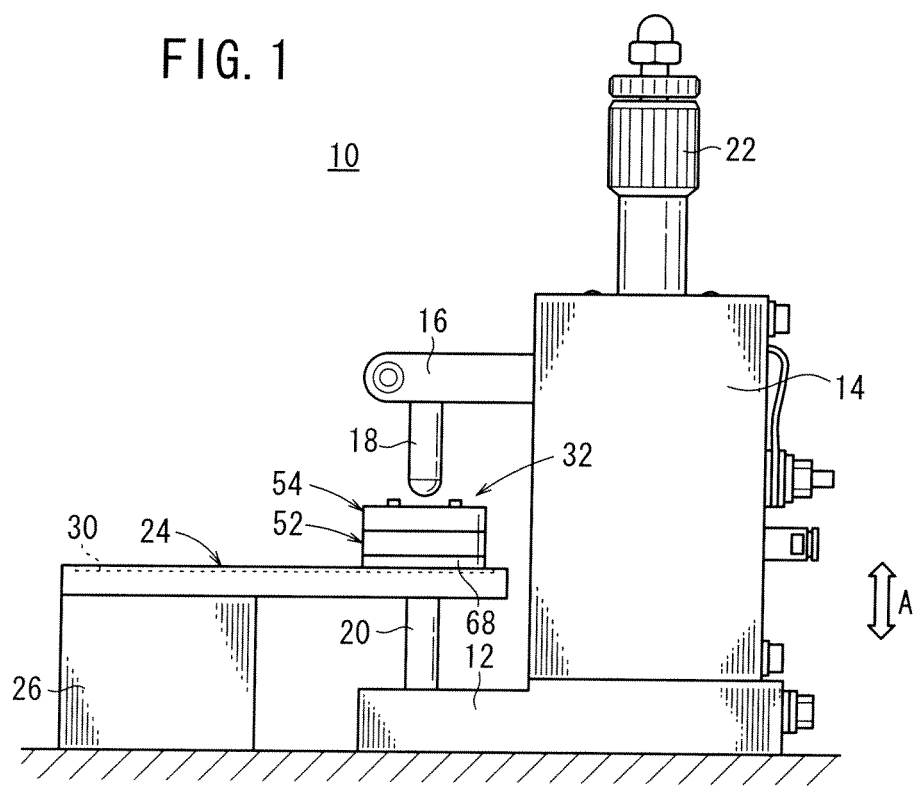
FIG. 1 is a side elevational view schematically showing a resistance welder according to a first embodiment of the present invention.
Figure 2:
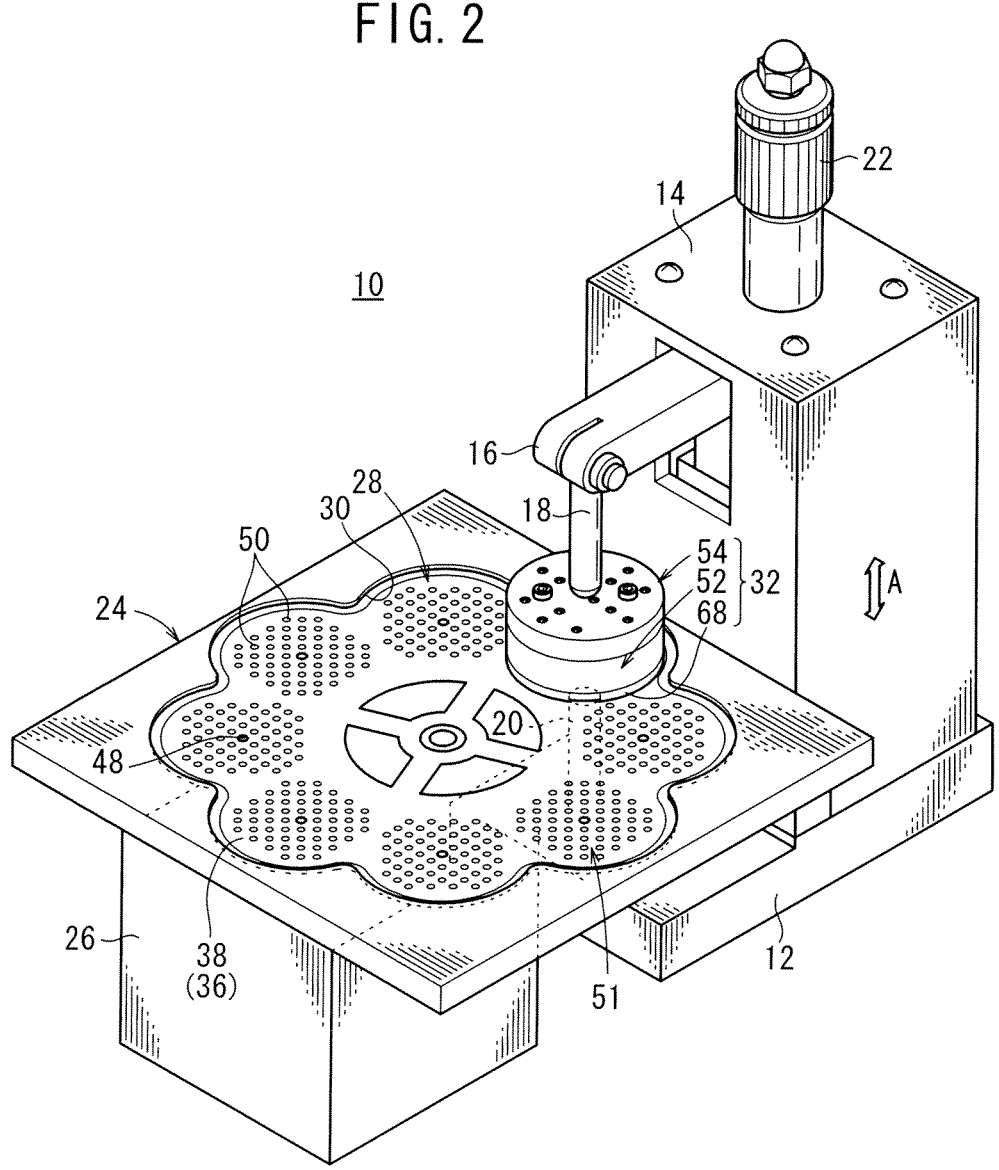
FIG. 2 is a perspective view schematically showing the resistance welder.

As shown in FIGS. 1 and 2, a resistance welder 10 according to a first embodiment of the present invention includes a base 12 on which a body 14 is mounted. An upper electrode (one of electrodes) 18 is attached to the body 14 via a vertical moving holder 16. A lower electrode 20 is attached to the base 12 so that the lower electrode 20 is coaxially opposed to the upper electrode 18.

Provided to the body 14 is a pressurizing mechanism 22 for moving the vertical moving holder 16 in a vertical direction (a direction shown by an arrow A) by a manual operation or by an actuator to apply a welding pressure to the upper electrode 18.

A base plate 24 is placed on the lower electrode 20 and is supported by a backup member 26. The base plate 24 is made of copper or copper alloy such as oxygen-free copper (OFCu) and tough pitch copper (TCu), and is provided with a recess 30 corresponding to a shape of a below-described separator 28. An electrode unit 32 electrically connected with the upper electrode 18 is disposed on the base plate 24.

Figure 3:
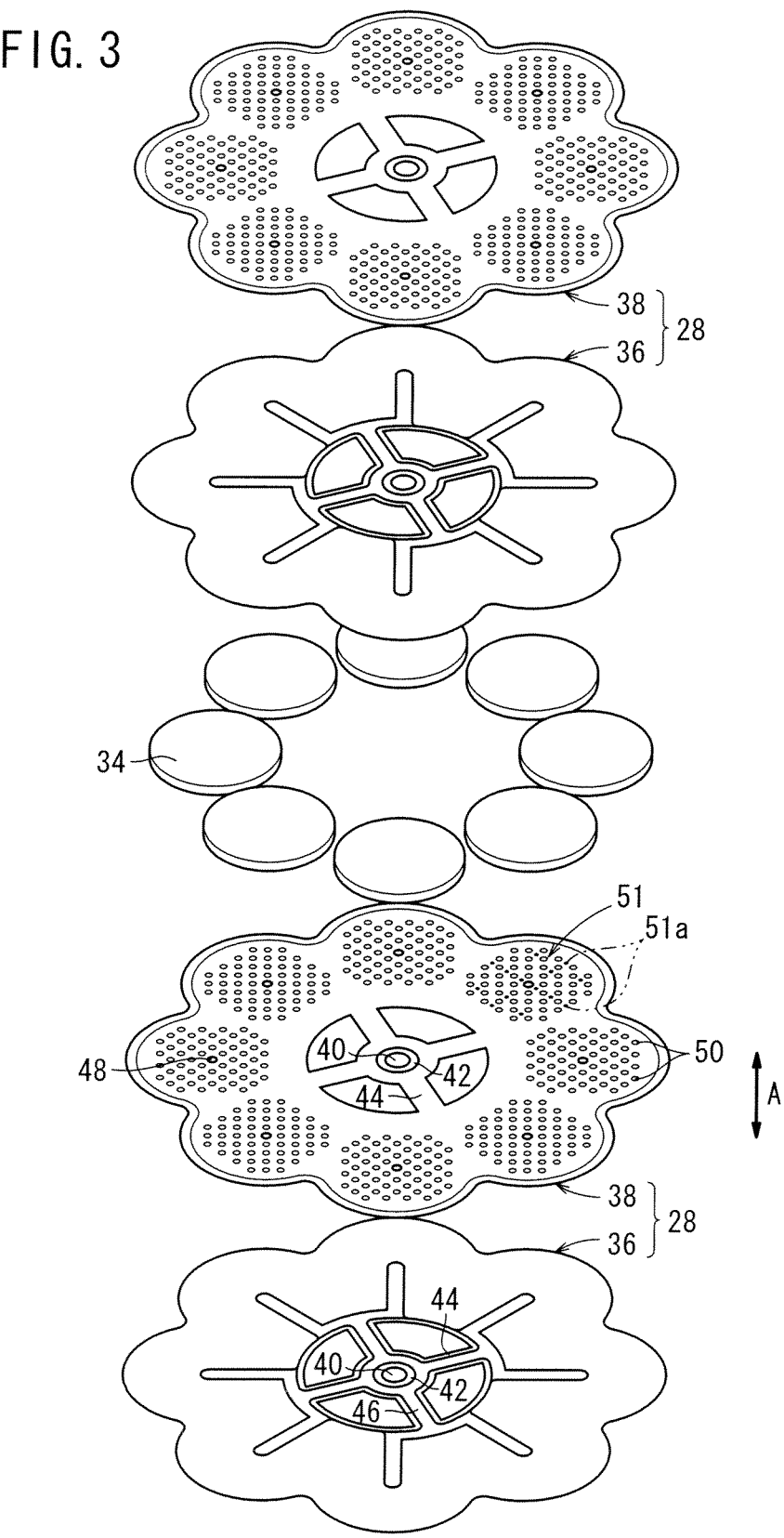
FIG. 3 is an exploded perspective view showing a separator to be welded by the resistance welder.

The separator 28 serves as a bipolar plate sandwiching an MEA 34 having an anode and a cathode disposed on both sides of an electrolyte, the bipolar plate being used in a solid oxide fuel cell (SOFC), solid polymer electrolyte fuel cell (SPFC), phosphoric-acid fuel cell (PAFC), molten carbonate fuel cell (MCFC) and the like (see FIG. 3).

The separator 28 includes two plates 36 and 38 provided by metal plates of stainless steel and the like, which are integrated by resistance welding (spot welding). A fuel gas supply unit 42 defining a fuel gas supply passage 40 is provided at the center of the plates 36 and 38. Bridge sections 44 radially extend from the fuel gas supply unit 42 are respectively provided with a fuel gas supply channel 46 that is in communication with the fuel gas supply passage 40.

The fuel gas supply channels 46 radially extend in eight directions between the plates 36 and 38, and are in communication with fuel gas supply holes 48 formed on the plate 38 near terminal ends thereof.

A plurality of projections 50 to be in contact with the MEA 34 project on the plate 38 around the respective fuel gas supply holes 48. The plates 36 and 38 are spot-welded at a flat portion between the projections 50 and have a plurality of welding points 51a at an MEA-sandwiching portion 51 at which each of the MEA 34 is disposed.

Figure 4:
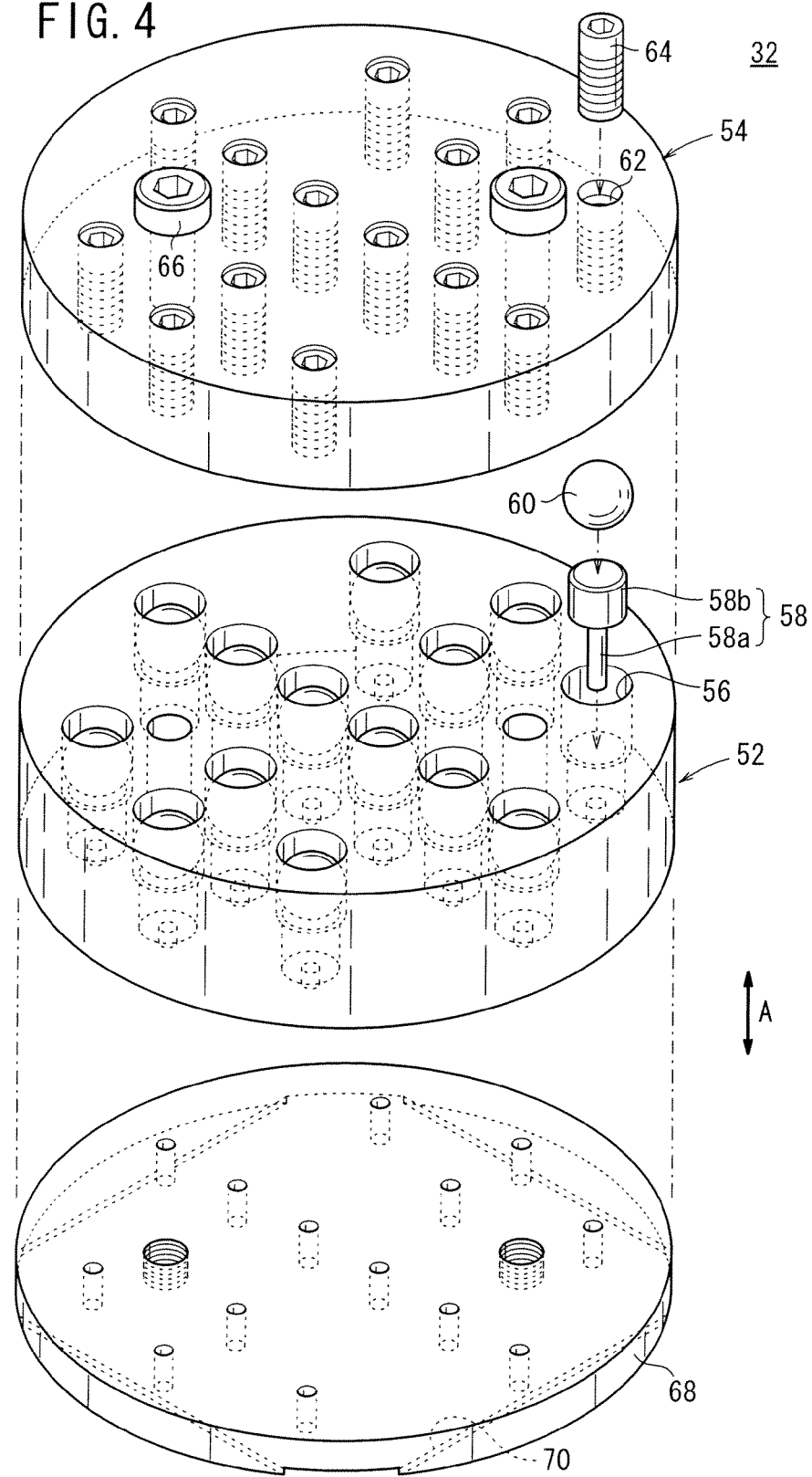
FIG. 4 is an exploded perspective view showing an electrode unit of the resistance welder.
Figure 5:
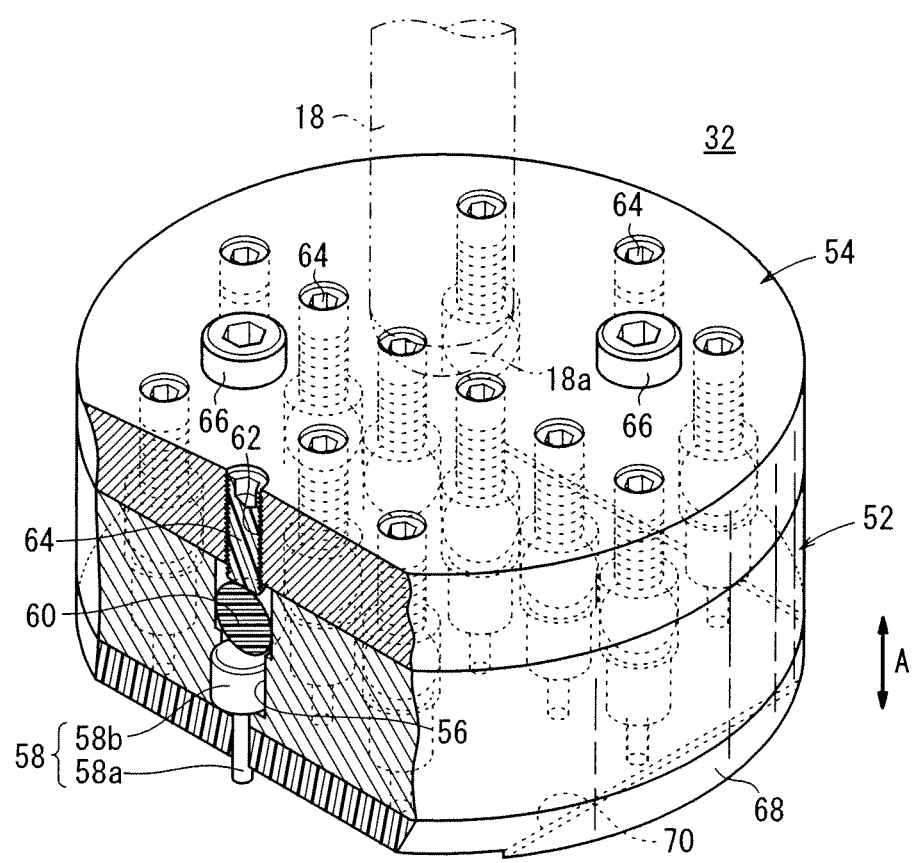
FIG. 5 is a perspective view showing the electrode unit.

As shown in FIGS. 4 and 5, the electrode unit 32 is provided with a first case 52 and a second case 54. The first case 52 and the second case 54 are disc-shaped. The first case 52 and the second case 54 are preferably provided by the same electroconductive material such as copper and copper alloy.

A plurality of stepped holes 56 are bored in the first case 52. An electrode pin 58 that is in contact with the separator (workpiece) 28 to apply electric current and is independently movable toward and away from the separator 28 is disposed in the stepped holes 56. The number of the electrode pins 58 is determined in accordance with the number of welding points necessary for the workpiece. Specifically, the number of the electrode pins 58 is set equal to the welding points 51a of the respective MEA sandwiching portions 51.

The electrode pin 58 is made of copper, copper alloy, copper tungsten (CuW), chromium copper (CrCu), beryllium copper (Cu—Be), alumina dispersion strengthened copper ($Al_2O_3Cu$) or the like. The electrode pin 58 has a contact end 58a that is inserted into a smaller-diameter portion of the stepped hole 56 to be contacted with the separator 28 and a head 58b that is provided opposite to the contact end 58a and is slidably disposed in a larger-diameter portion of the stepped hole 56.

An elastic body such as a resin ball (welding pressure adjusting mechanism) 60 that is exemplarily made of silicone rubber and is in contact with the head 58b of the electrode pin 58 for adjusting the welding pressure to be applied on the separator 28 is disposed in the large-diameter portion of the stepped hole 56.

A plurality of threaded holes 62 coaxial with the respective stepped holes 56 of the first case 52 are provided in the second case 54. A screw member such as a setscrew (protrusion adjusting mechanism) 64 for adjusting a protrusion of the electrode pin 58 toward the separator 28 is screwed into the respective threaded holes 62. The setscrew 64 is provided by a resin material and the like.

The first case 52 and the second case 54 are integrally fastened by a screw 66. An insulating plate 68 provided by Bakelite and the like is firmly attached to the first case 52. A rectangular recess 70 for receiving the plurality of projections 50 provided on the respective MEA sandwiching portions 51 to position the electrode unit 32 relative to the MEA sandwiching portion 51 is provided in the insulating plate 68 at a side facing the separator 28. The upper electrode 18 has a semi-spherical end 18a that is in contact with the electrode unit 32.

An operation of the electrode unit 32 and the resistance welder 10 will be described below.

Initially, as shown in FIG. 2, the plate 36 as a part of the separator 28 is placed in the recess 30 provided in the base plate 24. The plate 38 is overlaid on the plate 36. The electrode unit 32 is positioned on the plate 38 corresponding to the predetermined MEA sandwiching portion 51.

Subsequently, the pressurizing mechanism 22 of the resistance welder 10 is operated to move the upper electrode 18 downward in conjunction with the vertical moving holder 16. Thus, the upper electrode 18 contacts with the second case 54 of the electrode unit 32 to press the electrode unit 32 toward the base plate 24.

Figure 6:
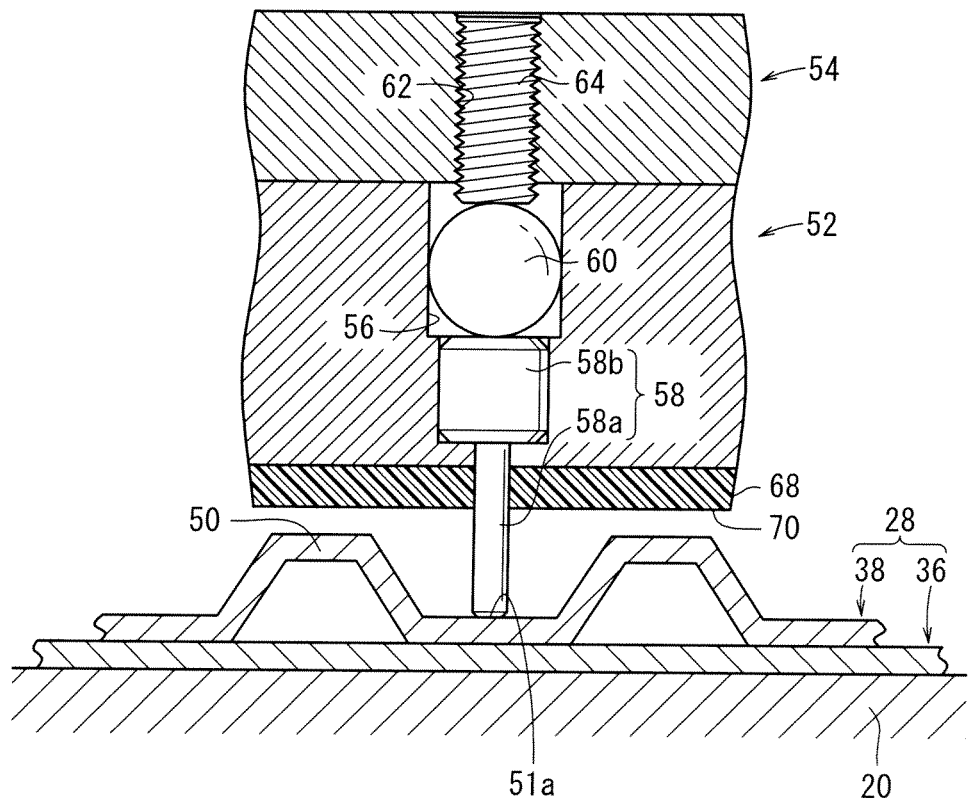
FIG. 6 is an explanatory view showing an electrode pin of the electrode unit that is in contact with a welding point.
Figure 7:
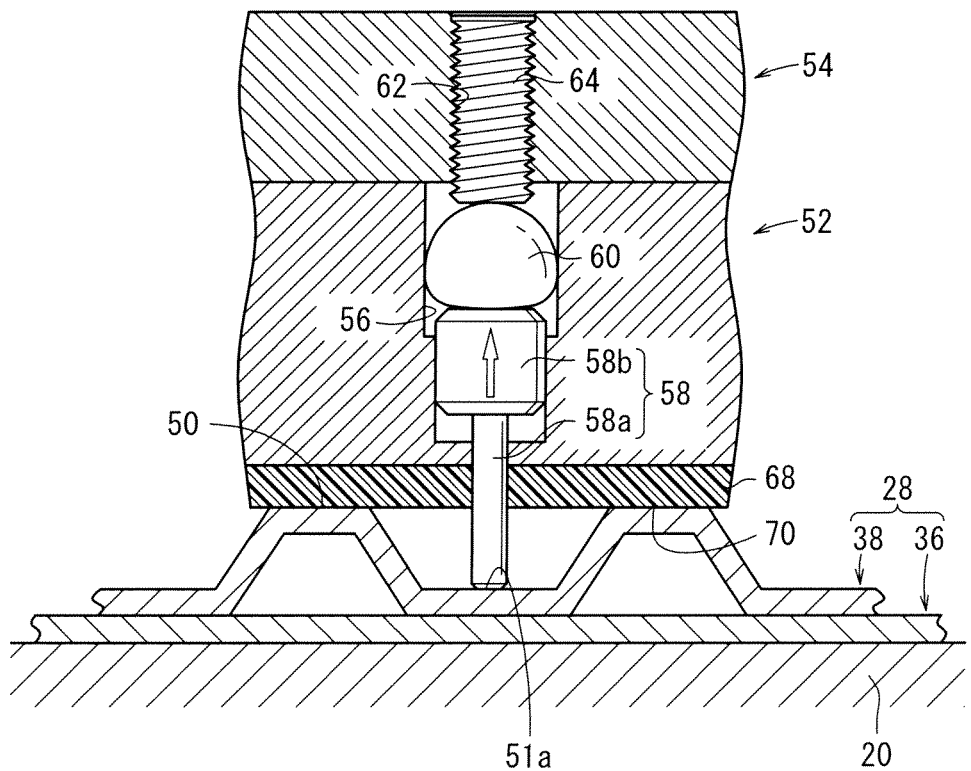
FIG. 7 is an explanatory view showing a reaction force applied on the electrode pin.

Consequently, in the electrode unit 32, the contact end 58a of the respective electrode pins 58 touches the welding point 51a on the plate 38 (see FIG. 6). While the upper electrode 18 is pressed downward until a predetermined pressure is reached, the electrode pins 58 receive a reaction force from the plate 38 (see an arrow in FIG. 7). At this time, since the resin ball 60 is disposed on the side of the head 58b of the respective electrode pins 58, the reaction force applied to the electrode pin 58 is adjusted by an elastic deformation of the resin ball 60, so that the welding pressure of the electrode pins 58 is independently adjusted.

Subsequently, in the resistance welder 10, the pair of positive and negative electrodes (i.e. the upper electrode 18 and the lower electrode 20) feed electric current to the respective electrode pins 58 through the upper electrode 18 and the electrode unit 32.

Thus, in the first embodiment, the plurality of welding points 51a on the plates 38 and 36 are simultaneously welded via the plurality of electrode pins 58 provided on the electrode unit 32 under the pressure applied by the upper electrode 18. Hence, a plurality of points can be welded with a single control system.

Further, the resin ball 60 is used as the welding pressure adjusting mechanism for the respective electrode pins 58. Highly elastic material such as silicone rubber and urethane rubber is used for the resin ball 60, so that the pressure can be adjusted over a wide range even in the stepped holes 56 that are formed in a compact size. Particularly, even when the welding points 51a are randomly arranged, the pressure can be evenly applied for the respective electrode pins 58.

Further, in the first embodiment, the protrusion adjusting mechanism in the form of the setscrew 64 is screwed to the second case 54 corresponding to each of the electrode pins 58. Accordingly, only by adjusting the setscrew 64 for each of the electrode pins 58, the stroke of the respective electrode pins 58 can be independently and securely adjusted. Thus, even when the welding points 51a are not located on a flat plane, the respective points 51a can be appropriately and securely welded.

Incidentally, the stroke of each of the electrode pins 58 can be adjusted by welding a test sample of the separator 28 in advance and detecting the welding status of each of the electrode pins 58.

According to the first embodiment, without being affected by a surface profile (concavity and convexity) of the separator 28, a multiple number of the welding points 51a can be evenly contacted at an even pressure with a simple and compact arrangement, thus allowing high-quality welding.

Further, since a single control system can be used, it is not necessary to provide a cylinder or a transformer for each of the electrode pins 58, so that the size and weight of the entire resistance welder 10 can be easily reduced.

Further, the first case 52 and the second case 54 in the first embodiment are made of an electroconductive material such as copper and copper alloy. Thus, electric current can be applied to the separator 28 through the upper electrode 18, the second case 54, the first case 52 and the electrode pin 58. In addition, the resin ball 60 is used as the welding pressure adjusting mechanism and the setscrew 64 is used as the protrusion adjusting mechanism. Thus, the arrangement of the electrode unit 32 can be simplified and economized.

Further, the end 18a of the upper electrode 18 is semispherical. Accordingly, when a welding pressure is applied to the upper electrode 18, the end 18a and the electrode unit 32 can be kept in contact with each other irrespective of the angle of the end 18a. Accordingly, the electrode unit 32 can be securely pressed by the upper electrode 18, so that the respective electrode pins 58 can be securely kept in contact with the separator 28.

Figure 8:
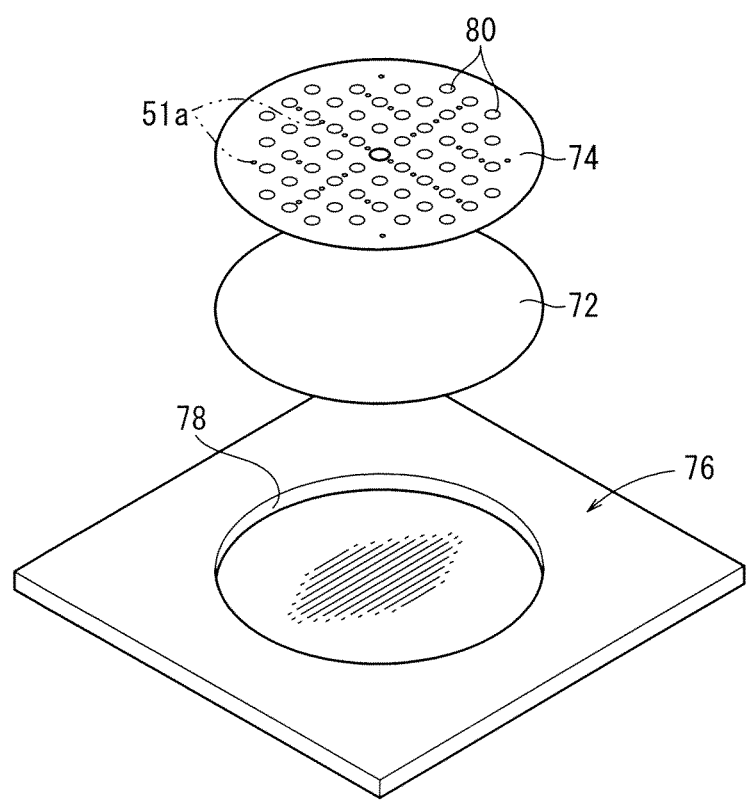
FIG. 8 is an exploded perspective view showing a metal plate to be welded by the resistance welder.

Still further, the first embodiment can be used for welding two disc-shaped metal plates 72 and 74 as shown in FIG. 8 instead of the separator 28 as the workpieces. In this arrangement, a base plate 76 exemplarily has a circular recess 78 corresponding to the profile of the metal plate 72 and 74.

The metal plate 72 has a flat shape. On the other hand, the metal plate 74 has a plurality of embossed portions 80. The metal plates 72 and 74 are bonded at a plane surrounding the embossed portions 80 via a plurality of bonding points 51a.

On the other hand, the electrode unit 32 only requires the number of electrode pins 58 corresponding to the welding points 51a of the metal plates 72 and 74. Accordingly, the metal plates 72 and 74 can be easily and securely bonded using the resistance welder 10 by a single control system.

Incidentally, the metal plates 72 and 74 may be shaped in various profiles other than the circular profile. According to the above arrangement, two workpieces, one of which (metal plate 74) has concavity and convexity (e.g. embossed portions 80), can be favorably welded at the plurality of welding points 51a.

Figure 9:
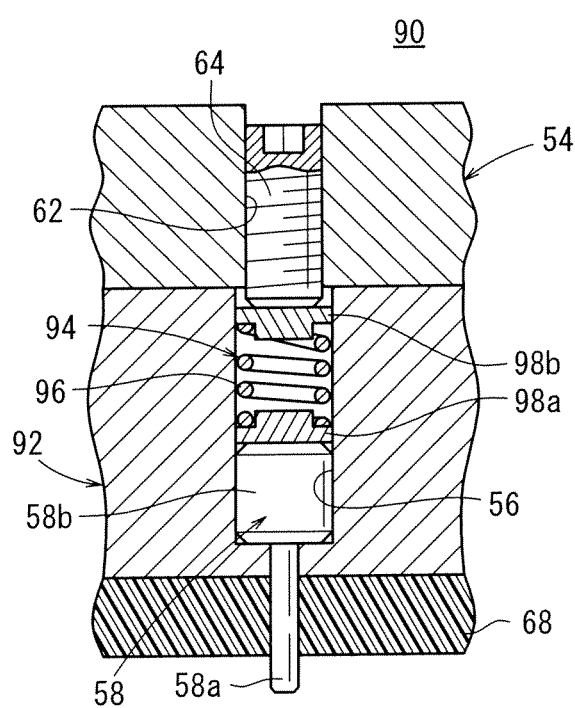
FIG. 9 is a cross section showing a part of an electrode unit according to a second embodiment of the present invention.

FIG. 9 is a cross section showing a part of an electrode unit 90 according to a second embodiment of the present invention. It should be noted that the same components as those of the electrode unit 32 according to the first embodiment will be denoted by the same reference numerals to omit detailed explanation thereof. The above also applies to the following third and fourth embodiments.

An electrode unit 90 includes a first case 92 and a second case 54. The first case 92 may be provided by a resin material as well as an electroconductive material such as copper and copper alloy. Each of the plurality of stepped holes 56 provided on the first case 92 receives the electrode pins 58 so that the electrode pins 58 are independently movable. A welding pressure adjuster 94 is provided near heads 58b of the electrode pins 58.

The welding pressure adjuster 94 includes a spring member (e.g. a spring 96) and seats 98a and 98b disposed on upper and lower ends of the spring 96. The spring 96 and the seats 98a and 98b are provided by an electroconductive member such as copper and copper alloy.

In this second embodiment, an elastic deformation of the spring 96 is used for adjusting the welding pressure of the electrode pin 58, so that advantages similar to that in the above-described first embodiment using the resin ball 60 can be obtained.

Further, the setscrew 64 provided by an electroconductive material such as copper and copper alloy allows current distribution to the electrode pin 58 through the second case 54, the setscrew 64, the seat 98b, the spring 96 and the seat 98a. Thus, in addition to the advantages of the above first embodiment, the first case 92 can be provided by a resin material.

Figure 10:
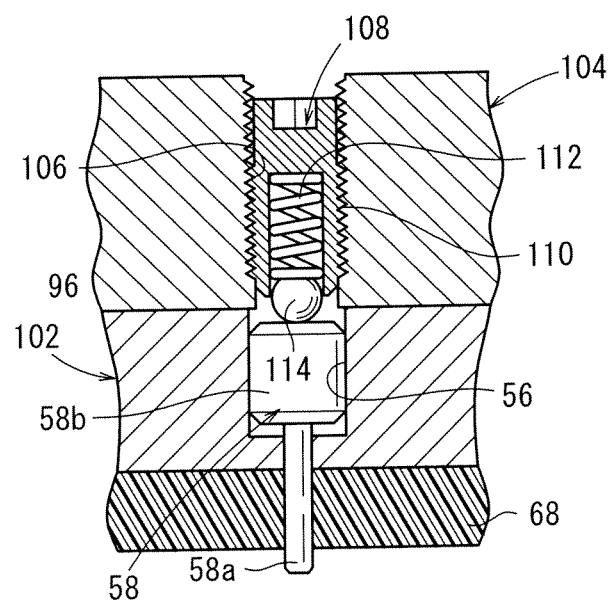
FIG. 10 is a cross section showing a part of an electrode unit according to a third embodiment of the present invention.

FIG. 10 is a cross section showing a part of an electrode unit 100 according to a third embodiment of the present invention.

The electrode unit 100 includes a first case 102 and a second case 104. The first case 102 and the second case 104 are provided by an electroconductive material such as copper and copper alloy. The stepped holes 56 of the first case 102 receive the electrode pins 58 so that the electrode pins 58 are movable back and forth. A ball plunger 108 serving both as the welding pressure adjusting mechanism and protrusion adjusting mechanism is screwed into a threaded hole 106 provided on a second case 104.

The ball plunger 108 includes a cylindrical thread 110 screwed to the threaded hole 106, a spring 112 disposed inside the cylindrical thread 110 and a ball 114 disposed at an end of the cylindrical thread 110. The ball 114 touches the head 58b of the electrode pin 58.

According to the above arrangement, the spring 112 is elastically deformed to adjust the welding pressure of the electrode pin 58. In addition, the cylindrical thread 110 is threadably rotated to adjust the stroke of the electrode pin 58.

Hence, the welding pressure adjusting mechanism and the protrusion adjusting mechanism in this third embodiment are provided by a single component (i.e. the ball plunger 108), thus further simplifying the structure of the electrode unit.

Figure 11:
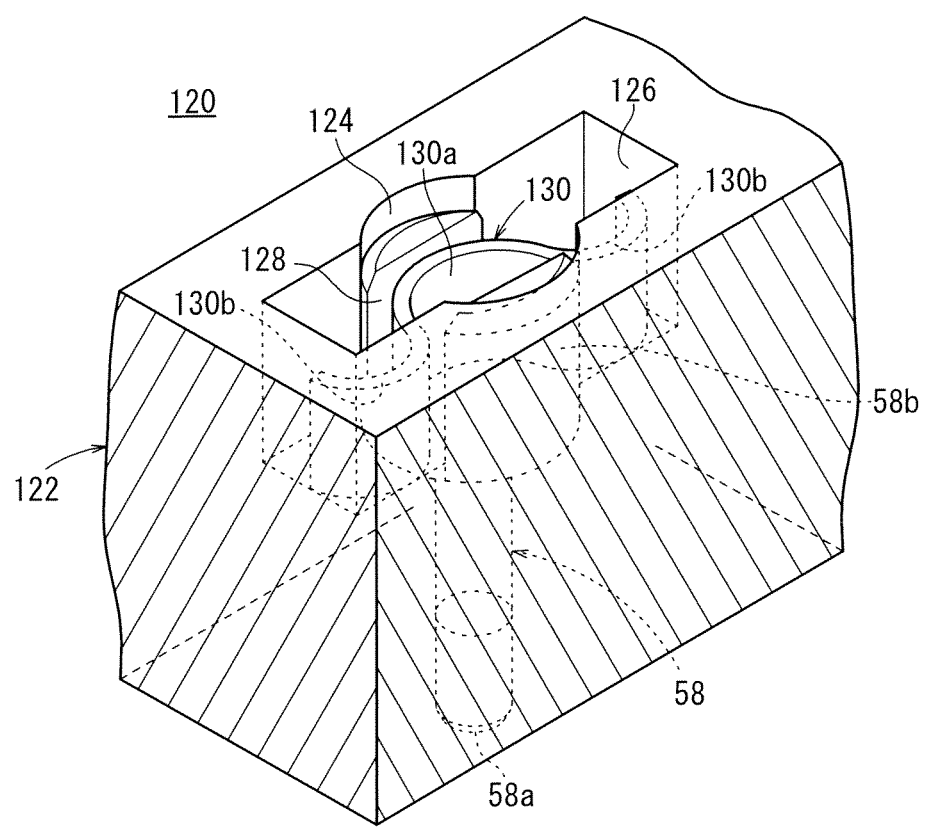
FIG. 11 is a perspective view showing a relevant part of an electrode unit according to a fourth embodiment of the present invention.
Figure 12:
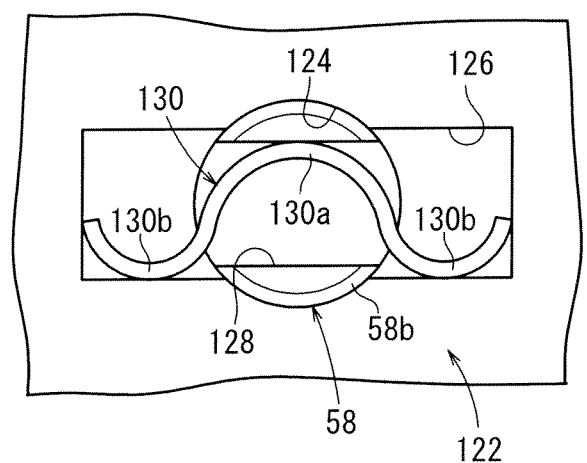
FIG. 12 is a plan view showing a relevant part of the electrode unit.
Figure 13:
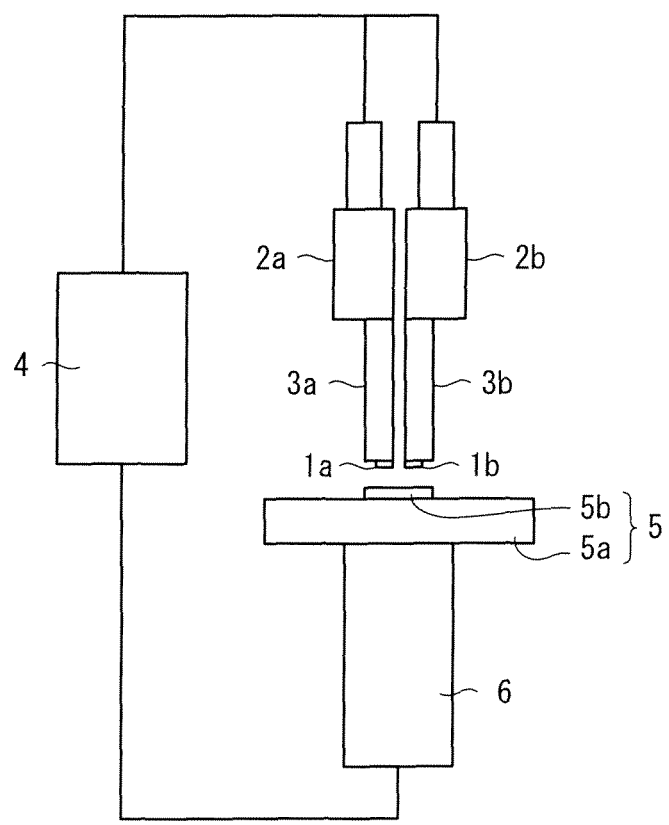
FIG. 13 is an explanatory view showing a welder disclosed in Japanese Laid-Open Publication No. 2002-35945.

FIG. 11 is a perspective view showing a relevant part of an electrode unit 120 according to a fourth embodiment of the present invention. FIG. 12 is a plan view showing the relevant part of the electrode unit 120. It should be understood that the fourth embodiment can be practically applied to the first to third embodiments.

The electrode unit 120 includes a first case 122. The first case 122 is provided with an opening (i.e. a stepped hole 124)

in which the electrode pin 58 is axially slidable. A slitted opening 126 extending in a radial direction of the head 58b of the electrode pin 58 is provided on an inner wall of the stepped hole 124.

A slit 128 is provided on the head 58b of the electrode pin 58. A bent or curved metal elastic body (e.g. a plate spring 130) is disposed in the slit 128 and the slitted opening 126.

The plate spring 130 is provided by an electroconductive material such as copper and copper alloy. A central bent portion 130a of the plate spring 130 is in contact with an inner wall of the head 58b forming the slit 128. Bent portions 130b on both ends of the plate spring 130 are in contact with a wall forming the slitted opening 126. Thus, the head 58b of the electrode pin 58 is continuously pressed toward the inner wall of the stepped hole 124 of the first case 122.

In this fourth embodiment, the first case 122 and the plate spring 130 are provided by copper or copper alloy. Thus, electric current is supplied to the electrode pin 58 via the plate spring 130 that is in contact with the inner wall of the slit 128 of the electrode pin 58 and the inner wall of the slitted opening 126 of the first case 122.

Further, when the electrode pin 58 advances and retracts in the stepped hole 124, the plate spring 130 is continuously in electrical connection with the first case 122 and the electrode pin 58. Thus, a contact resistance at the sliding portion can be maintained at a constant value, so that the electric current can be securely supplied from the electrode pin 58.

Incidentally, the metal elastic body may be provided in a variety of ways. For instance, the metal elastic body may be provided by bending and curving a rod-shaped spring member instead of using the plate spring 130.

Further, though the workpieces are held between the upper electrode 18 and the lower electrode 20 and are welded at a plurality of points in the first to fourth embodiments, the present invention can be also applied in an arrangement in which a pair of positive and negative electrodes are contacted to the same side of the workpiece(s) to conduct a multiple-point welding (series welding).

The invention claimed is:

1. An electrode unit used in a resistance welder having a pair of positive and negative electrodes, the resistance welder pressing and energizing a workpiece by the electrodes to weld the workpiece, the electrode unit comprising:
    a case interposed between one of the electrodes and the workpiece;
    a plurality of electrode pins provided in the case, the plurality of electrode pins being independently movable toward and away from the workpiece to be in contact with the workpiece for applying an electric current to the workpiece;
    a welding pressure adjusting mechanism that independently adjusts a welding pressure applied on each of the electrode pins toward the workpiece; and
    a protrusion adjusting mechanism that independently adjusts a protrusion of each of the electrode pins toward the workpiece, wherein
    the electrode pin is provided with a contact end touching the workpiece and a head opposite to the contact end, the head having a slit,
    the case has an opening in which the electrode pin is axially slidable and a slitted opening extending in a radial direction of the head is provided on an inner wall of the opening, and
    a metal elastic body having a bent or curved shape is provided in the slit and the slitted opening, the metal elastic body pressing the head of the electrode pin toward the inner wall.

2. The electrode unit according to claim 1, wherein at least a part of the case is provided by an electroconductive material.

3. The electrode unit according to claim 1, wherein the welding pressure adjusting mechanism comprises an elastic member that is in contact with the electrode pin to adjust the welding pressure by elastic deformation.

4. The electrode unit according to claim 1, wherein the welding pressure adjusting mechanism comprises a spring member that is in contact with the electrode pin to adjust the welding pressure by elastic deformation.

5. The electrode unit according to claim 1, wherein the protrusion adjusting mechanism comprises a screw member that is disposed on an axis of the electrode pin and allows an adjustment of protrusion of the electrode pin by adjusting a screwed length.

6. The electrode unit according to claim 4, wherein the protrusion adjusting mechanism comprises a screw member that is disposed on an axis of the electrode pin and allows an adjustment of protrusion of the electrode pin by adjusting a screwed length.

7. The electrode unit according to claim 6, wherein the electrode pin, the screw member and the spring member are provided by copper or a copper alloy.

8. The electrode unit according to claim 1,
wherein
the welding pressure adjusting mechanism and the protrusion adjusting mechanism comprise a ball plunger that is disposed on an axis of the electrode pin and allows an adjustment of the welding pressure and protrusion of the electrode pin by adjusting a screwed length.

9. The electrode unit according to claim 1,
wherein
the one of the electrodes has a hemispherical end that is in contact with the electrode unit.

* * * * *